E. SOLVAY.
Ammonia Soda Manufacture.
No. 198,699. Patented Dec. 25, 1877.
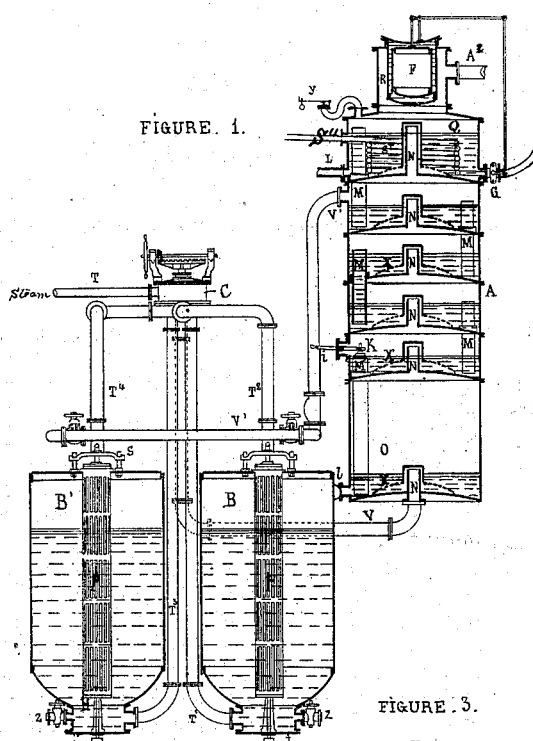
FIGURE. 1.
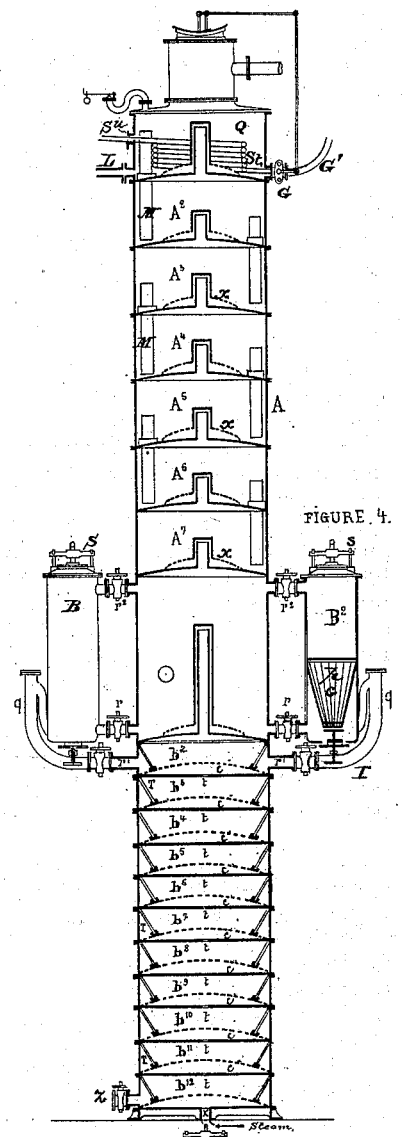
FIGURE. 4.
FIGURE. 3.
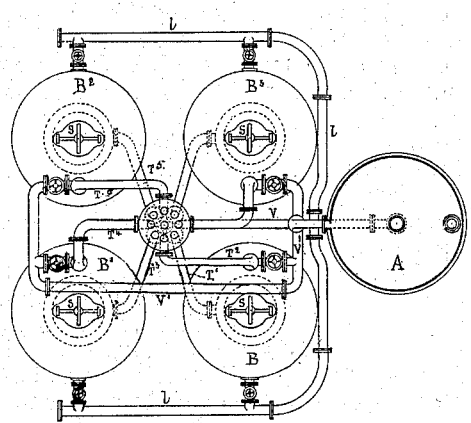
FIGURE. 2.
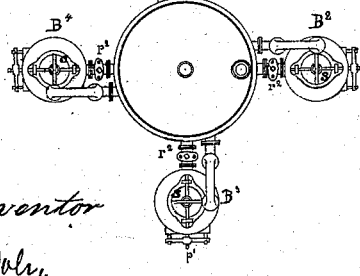
FIGURE. 5.
Witnesses
Inventor

UNITED STATES PATENT OFFICE.

ERNEST SOLVAY, OF BRUSSELS, BELGIUM.

IMPROVEMENT IN THE AMMONIA-SODA MANUFACTURE.

Specification forming part of Letters Patent No. 198,699, dated December 25, 1877; application filed June 2, 1876.

*To all whom it may concern:*

Be it known that I, ERNEST SOLVAY, of Brussels, in the Kingdom of Belgium, manufacturer, have invented certain Improvements in the Manufacture of Carbonates of Soda by the Ammoniacal Process, of which the following is a specification:

This invention relates to certain improvements in the manufacture of carbonate of soda by the ammoniacal process; and it consists in an apparatus for distilling the ammonia contained in the liquor which has been separated from the bicarbonate of soda after the formation of the same, as more fully hereinafter described.

In the drawings, Figure 1 represents a vertical sectional view of my improved apparatus. Fig. 2 represents partly a plan and partly a sectional view of the same, and Fig. 3 a detached plan view of one of the false bottoms of the distilling-column. Fig. 4 represents a modication of the apparatus, and Fig. 5 a top view of the same.

In the drawing, A represents column for distilling without lime, and B $B^1$ $B^2$ $B^3$ distilling-boilers for distilling with lime. When water is used in the coil $S^t$ the eduction end of said coil should extend out through an opening, $S^u$, in the wall of the column to any point where it is desirable that the water should be discharged, and the liquid to be distilled is then admitted to the column A through the pipe L, a short portion only of which is shown in the drawing, but which will be understood to connect with a tank containing a supply of the liquid to be distilled, which, entering the chamber Q, overflows through the pipe M of said chamber, and passes into the next chamber below, in which it similarly overflows, and so in the several compartments, until it finally passes into the boilers through the branching pipe *l*, leading from near the bottom of the column. When, however, as is preferable, the liquid to be distilled flows through the coil $S^t$, as heretofore explained, the opening $S^u$ and pipe L should be closed, and the coil which is connected with the pipe G', leading from the liquid-tank, terminates inside of the chamber Q, and the liquid passing through said coil escapes into said chamber, and overflows therefrom, passing downward, as before explained.

Four of said distilling-boilers are represented in the present instance; but any suitable number may be employed. The said boilers communicate one with another by means of a distributer, C, of well-known construction, such as is used in gas-works and other manufactories. The said distributer allows one or more of the boilers to be isolated successively for the purpose of emptying, cleansing, or refilling, without interrupting the operation in the others. Thus, for instance, supposing four boilers are employed, as represented, then there will always be three in the circuit in which the operation is going on. The steam required for the distillation, and which may be the exhaust-steam of the motive-engines, passes through the pipe T into the distributer C, and then through the pipe $T^1$ into the boiler B, which has been previously filled with lime and ammoniacal liquor. The steam then passes out through the pipe $T^2$, and again enters the distributer, passing out therefrom through the pipe $T^3$, and entering the second boiler, $B^1$. In like manner the steam is made to enter the third boiler, which has just been filled, so that the fresh steam enters that boiler in which is the ammoniacal liquid, from which the last traces of ammonia are to be removed. On leaving $B^2$, the steam, after having re-entered the distributer, passes through the pipe V into the distilling-column A, where it effects the distillation of the ammonia, either as caustic or carbonate of ammonia.

The last compartment, Q, of the distilling-column acts as a refrigerator, in which the vapor of water is condensed, so that the ammonia alone passes out through the pipe $A^2$. Instead of using the water in the coil of pipes $S^t$, I prefer to use the liquid which is to be distilled, so as to heat it to a certain point previously to the distillation. Above the compartment Q is a regulating apparatus actuated by the variations of temperature. The said apparatus consists of a float, F, in a reservoir, R, containing a small quantity of water. The gases emitted in the process of distillation communicate more or less heat to the said water, and when the temperature is sufficiently high they cause the said float to move downward, and to open a cock or tap, G, admitting water or liquid into the coils of pipe from a suitable tank connected therewith by pipe G. Instead of acting upon the liquid in the coil of pipes, the said float may be made to act upon a butterfly-valve, or other arrangement regulating the admission of steam to the distilling apparatus.

The liquid passes out from the distilling-column into the pipe $l$, which conveys it to the distilling-boiler, which has just been emptied and charged with lime.

Before having charged the boiler the lime may be slaked; but I prefer to use the heat produced in the slaking process, and to introduce the lime in blocks or pieces, (as it leaves the limekiln,) by the door S, into the basket $p$, which retains the unburned parts and foreign matters. When the boiler is emptied the residuum is removed through the door I, which supports the bottom H of the baskets.

Instead of the lime-basket $p$ being mounted in the center of the boiler, it may be placed at the side, the residuum being then removed through a doorway in the side of the boiler. The steam-pipe might then be placed in the center, and be used also to empty the boiler.

It will be understood that by the arrangements hereinbefore described the disengagement of the ammonia produced by the action of the rising liquid upon the lime is successive, and can never exceed certain limits, so as to become dangerous, for as soon as the pressure within the boiler which is being filled becomes too great it prevents the liquid from entering the apparatus until the pressure is sufficiently reduced.

The heat produced by the slaking of the quicklime produces steam, which steam may be utilized in the distilling-column, which it may enter either at the bottom through a pipe, V, or through pipes V', as shown in the drawing.

I wish to point out specially the perforated dished plates used in the columns A, which are made convex, and perforated with tapering holes, being also serrated at their periphery. This shape produces perfect absorption of the heat.

The letter $i$ represents a lever for actuating the valve K, which is intended to arrest the descent of the liquid when the lower compartment of the distilling-column O contains the quantity of liquid required for the boiler.

M represents overflow-pipes, through which the liquid descends. N are tubes through which the ammonia and steam pass. The letter $y$ represents a safety-valve at the end of a metal pipe, containing water or petroleum, to prevent the ammonia from corroding said pipe and its seat.

If preferred, the ordinary safety-tube may also be used.

Z represents the blow-off cocks of the boiler.

What I claim, and desire to secure by Letters Patent, is—

1. In combination with the distilling-boilers, the baskets for the reception of the quicklime, and for the introduction of said quicklime into the boilers, substantially as set forth.

2. In combination with pipes N, projecting upward from the partitions separating the chambers of a distilling-column, the perforated dished plates X, having central sockets to receive said pipes, substantially as described.

3. The combination, with a distilling-column having a series of vertically-arranged distilling-chambers, of the top chamber Q, containing the refrigerating-coil $S^t$ connected with the source of supply of the liquid to be distilled, substantially as and for the purpose set forth.

4. The combination, with the distilling-column A, of the pipe V, distributer C, and a series of boilers, each of which is connected with said distributer by an induction and eduction pipe, and arranged to be supplied with steam successively from said distributer, substantially as set forth.

5. In combination with the distilling-column A, a series of boilers connected therewith by the branching pipe $l$, for conducting liquid from said column to the boilers, and a steam-distributer connected with each of said boilers, and by means of which either of the same may be isolated from the others, substantially as set forth.

E. SOLVAY.

Witnesses:
R. S. KIRKPATRICK,
W. H. KIRKPATRICK.